United States Patent
Eledath et al.

(10) Patent No.: US 9,596,399 B2
(45) Date of Patent: Mar. 14, 2017

(54) APPARATUS FOR INTELLIGENT AND AUTONOMOUS VIDEO CONTENT GENERATION AND STREAMING

(71) Applicant: SRI International, Menlo Park, CA (US)

(72) Inventors: Jayakrishnan Kumar Eledath, Princeton, NJ (US); Sarah Paris-Mascicki, Monmouth Junction, NJ (US); Vincent Endres, Morristown, NJ (US); Barbara Hanna, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 758 days.

(21) Appl. No.: 13/727,223

(22) Filed: Dec. 26, 2012

(65) Prior Publication Data
US 2013/0182119 A1    Jul. 18, 2013

Related U.S. Application Data

(63) Continuation of application No. 12/186,863, filed on Aug. 6, 2008, now Pat. No. 8,339,456.

(Continued)

(51) Int. Cl.
*H04N 7/18* (2006.01)
*H04N 5/232* (2006.01)
(Continued)

(52) U.S. Cl.
CPC ............ *H04N 5/232* (2013.01); *G06K 9/209* (2013.01); *G06K 9/3216* (2013.01);
(Continued)

(58) Field of Classification Search
USPC ........................................................ 348/159
(Continued)

(56) References Cited

U.S. PATENT DOCUMENTS 6,303,920 B1 * 10/2001 Wixson ...................... 250/208.1
6,681,058 B1    1/2004 Hanna et al.
(Continued)

*Primary Examiner* — Chris Parry
*Assistant Examiner* — Alan S Chou
(74) *Attorney, Agent, or Firm* — Moser Taboada

(57) ABSTRACT

A system for automatically capturing an event of interest in a venue is disclosed, comprising a plurality of cameras for capturing video images of the event; and at least one processor communicatively connected to said plurality of cameras and configured to execute a plurality of modules, said modules comprising a rectification module for combining the video images to form a wide-angle view; at least one of a motion analysis module configured for tracking salient blobs that are not part of a background of the wide-angle view, an activity analysis module configured for extracting temporal and spatial patterns from the wide-angle view, and a shape and appearance module configured for selecting one or more objects in the wide-angle view based on descriptors that are scale and rotational invariant; and a region of interest selector for selecting a viewpoint from the wide-angle view based on output from at least one of the motion analysis module, the activity analysis module, and the shape and appearance module, wherein the region of interest selector outputs the selected viewpoint for display. The system further comprises at least one audio recording device for capturing audio from the event; and means for synchronizing the video images and audio.

16 Claims, 11 Drawing Sheets

Related U.S. Application Data

(60) Provisional application No. 61/053,432, filed on May 15, 2008.

(51) Int. Cl.
*G06K 9/20* (2006.01)
*G06K 9/32* (2006.01)
*G06T 7/20* (2006.01)
*H04N 21/218* (2011.01)
*H04N 21/44* (2011.01)

(52) U.S. Cl.
CPC .......... *G06T 7/2006* (2013.01); *G06T 7/2053* (2013.01); *H04N 7/181* (2013.01); *H04N 21/21805* (2013.01); *H04N 21/44008* (2013.01); *G06T 2200/32* (2013.01); *G06T 2207/10016* (2013.01); *G06T 2207/20076* (2013.01); *G06T 2207/30221* (2013.01)

(58) Field of Classification Search
IPC ...................................................... H04N 7/181
See application file for complete search history.

(56) References Cited

U.S. PATENT DOCUMENTS

| | | | |
|---|---|---|---|
| 7,024,677 B1 | 4/2006 | Snyder et al. | |
| 7,796,162 B2* | 9/2010 | Ortiz | 348/211.8 |
| 2003/0108242 A1* | 6/2003 | Conant | 382/190 |
| 2005/0220348 A1 | 10/2005 | Chiu et al. | |
| 2006/0170769 A1* | 8/2006 | Zhou | 348/143 |
| 2006/0181610 A1 | 8/2006 | Carlsson et al. | |
| 2008/0273751 A1 | 11/2008 | Yuan et al. | |

\* cited by examiner

APPARATUS FOR INTELLIGENT AND AUTONOMOUS VIDEO CONTENT GENERATION AND STREAMING

CROSS-REFERENCE TO RELATED APPLICATIONS

This application is a continuation of commonly assigned co-pending U.S. patent application Ser. No. 12/186,863, filed Aug. 6, 2008, which further claims the benefit of U.S. provisional patent application No. 61/053,432 filed May 15, 2008, the disclosure of which is incorporated herein by reference in its entirety.

FIELD OF THE INVENTION

The present invention relates generally to video and audio stream generation and delivery, and more particularly, to a compact video and audio capture, processing and encoding apparatus that creates a digital stream from a view of a scene of interest.

BACKGROUND OF THE INVENTION

Many live events are not broadcasted over TV channels or the Internet due to high operational and equipment costs and the requirements of human operated broadcasting. Currently, to broadcast sporting or other live events either on TV or over the Internet, it is necessary to employ a number of people with cameras to view the event from a number of angles. There is also a need to have some level of production and direction and a means to broadcast before that information is made available to subscribers. Prior art Internet broadcasting system present highlights of an event after it had already occurred, including a provision for commentary on individual highlights. In such systems, it is necessary to have cameras distributed over a stadium, operated by cameramen, accompanied by producers, directors and commentators. In recent Superbowls, systems were provided that distributed a plurality of cameras over the stadium without cameramen. Whenever something of interest happened, a human producer would direct a person in an operations booth in the studio to show the audience a play from a 360° view as part of a replay. A "Matrix"-style freeze and a 360° slow motion view around the person who was catching the ball or running with the ball (i.e., the Bullet-time effect) would be obtained. Unfortunately, it was still necessary for at least one human operator to take orders from the producer and operate a "master" camera that coordinated with a plurality of automated "slave" cameras to take the panoramic view. Thus, there was still some form of human intervention.

Accordingly, what would be desirable, but has not yet been provided, is a low cost and fully automated system that enables content owners to stream a wide range of indoor and outdoor live events over the Internet without the operational and maintenance burden of conventional broadcasting. The system would include a plurality of cameras and a computer that processes the video that is streaming from the cameras, the computer automatically deciding what it is that should be viewed from among the cameras and streaming the video and audio content over the Internet.

SUMMARY OF THE INVENTION

The above-described problems are addressed and a technical solution achieved in the art by providing a system for automatically capturing an event of interest in a venue, comprising a plurality of cameras for capturing video images of the event; and at least one processor communicatively connected to said plurality of cameras and configured to execute a plurality of modules, said modules comprising a rectification module for combining the video images to form a wide-angle view; at least one of a motion analysis module configured for tracking salient blobs that are not part of a background of the wide-angle view, an activity analysis module configured for extracting temporal and spatial patterns from the wide-angle view, and a shape and appearance module configured for selecting one or more objects in the wide-angle view based on descriptors that are scale and rotational invariant; and a region of interest selector for selecting a viewpoint from the wide-angle view based on output from at least one of the motion analysis module, the activity analysis module, and the shape and appearance module, wherein the region of interest selector outputs the selected viewpoint for display. The system further comprises at least one audio recording device for capturing audio from the event; and means for synchronizing the video images and audio.

The activity analysis module is further configured for: dividing the wide-angle view into a plurality of grids comprising pluralities of grid cells; within each grid cell, computing a histogram over multiple occurrences of blobs and their orientations from a plurality of frames to identify a dominant direction of each of the cells of the plurality of grids and to identify salient blobs from among the pluralities of cells; extracting patterns from the histogram over multiple occurrences and orientations of the blobs; and assembling the patterns into larger patterns into that indicate at least one global activity.

The motion analysis module is further configured for extracting the background from the wide-angle view and for determining optical flow. The descriptors that are scale and rotational invariant of the shape appearance module include one of silhouettes, contours, and silhouettes and contours of the objects.

The selecting of at least one of the extracted temporal patterns and spatial patterns to automatically determine a region of interest is based on content specific rules. The content specific rules include focusing the plurality of cameras on a portion of the event based on at least one of the location in the event with the most motion, the location where blobs are converging, the location of the largest number of blobs, the location of blobs in pre-defined positions in the wide-angle view, and the location in the event with the maximum motion in a specific direction. For example, when the event is a volleyball game, the content specific rules include focusing the plurality of cameras on a portion of the event based on selecting a player behind a service line. When the event is a football game, the content specific rules include focusing the plurality of cameras on a portion of the event based on automatically identifying whether the play is a "pass," a "run," a "punt," a "field goal attempt," or has resulted in a "touchdown." When the event is a basketball game, the content specific rules include focusing the plurality of cameras on a portion of the event based on selecting a player who is at a foul line and attempting a foul shot.

The modules executed by at least one processor further includes a panoramic view generation module with photometric correction for removing distortion in the video images, for providing at least color correction and white balance so as to compensate automatically for the venue being too bright or too dark, and for warping views of the plurality of cameras into a common coordinate system. The modules executed by the at least one processor further includes a module for analyzing the shape and appearance of the salient blobs based on 2-dimensional and/or 3-dimensional descriptors that are scale and rotational invariant. The rectification module is further configured for correcting for perspective and lens distortion visible in the wide-angle view and an information panel view by means of a one time calibration process whereby points in distorted views are manually mapped to points at ideal, undistorted locations and a recovery of projective warps from correspondences.

The system can further comprise a data distribution sub-system for receiving a stream of data comprising the video and audio in the region of interest and for distributing the stream over the Internet. The at least one processor is further configured for executing an encoding module for compressing the video images and audio. Each of the cameras further comprises optical components that are positioned to eliminate parallax between camera views. The system can further comprise an overlay module for overlaying pre-defined portions of an information panel view onto the selected region of interest (ROI) view. The system can further comprise a scheduling module for granting designated end users administrative and privileged access for the purpose of scheduling events and controlling the broadcast of an event in progress. The system can further comprise a remote monitoring and management module. The remote monitoring and management module can be configured for providing a "system health page" which presents a color-coded icon representing the health of components.

A geometric calibration can be performed to define the relative orientations between the venue and the cameras, comprising the steps of marking points of each of a plurality of landmarks in the views of each of the cameras; refining the marked points for sub-pixel accuracy; calculating a least mean square fit homography between a camera view and the venue for each of the camera views; and calculating homographies between camera views. A photometric calibration of a plurality of cameras in the venue can be performed, comprising the steps of (a) placing a white color flat calibration object in the field of view of a camera; (b) marking a region of the calibration object; (c) calculating white balance using imaged RGB values in a resulting camera view; and (d) repeating steps (a)-(c) until all of the cameras of the plurality of cameras have been visited.

BRIEF DESCRIPTION OF THE DRAWINGS

The present invention will be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Figure 1:
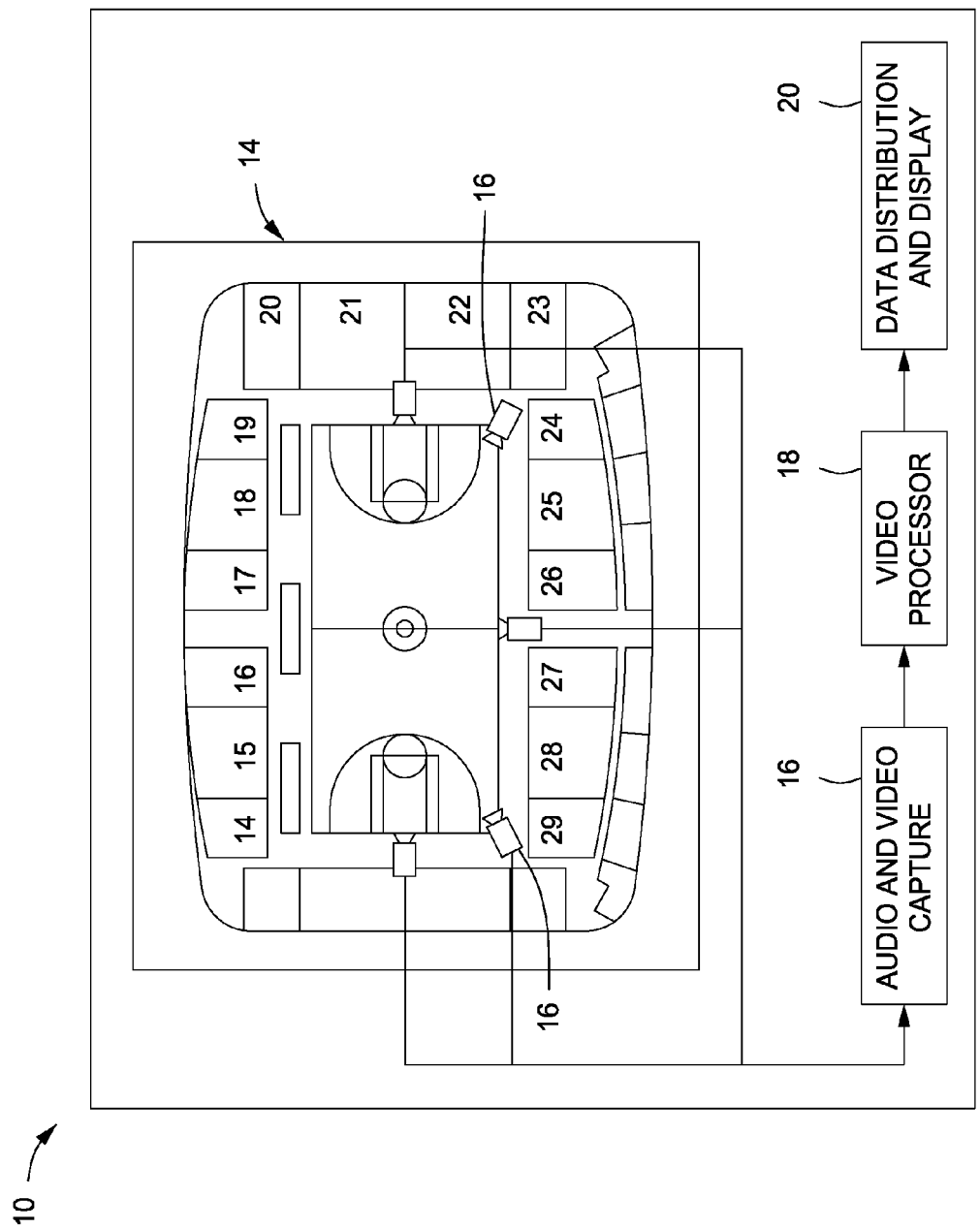
FIG. 1 is a high level block diagram of the hardware architecture of a system automatically capturing an event of interest in a venue, constructed according to an embodiment of the present invention.

Referring now to FIG. 1, there is shown a high level block diagram of a system 10 for automatically capturing and streaming a scene of interest in a venue, constructed according to an embodiment of the present invention. By way of a non-limiting example, the system 10 includes an audio and video capturing assembly 12 that receives audio and video associated with a venue 14 from a plurality of video cameras/microphones 16 distributed about the venue 14. The system 10 also includes a video processor sub-system 18 which received the captured video and audio from the assembly 12 and feeds processed video to a data distribution and display sub-system 20 which can include the Internet (not shown) and video equipment owned by subscribers (not shown), which can be a subscriber's PC, cell phone, high definition television etc.

Figure 2:
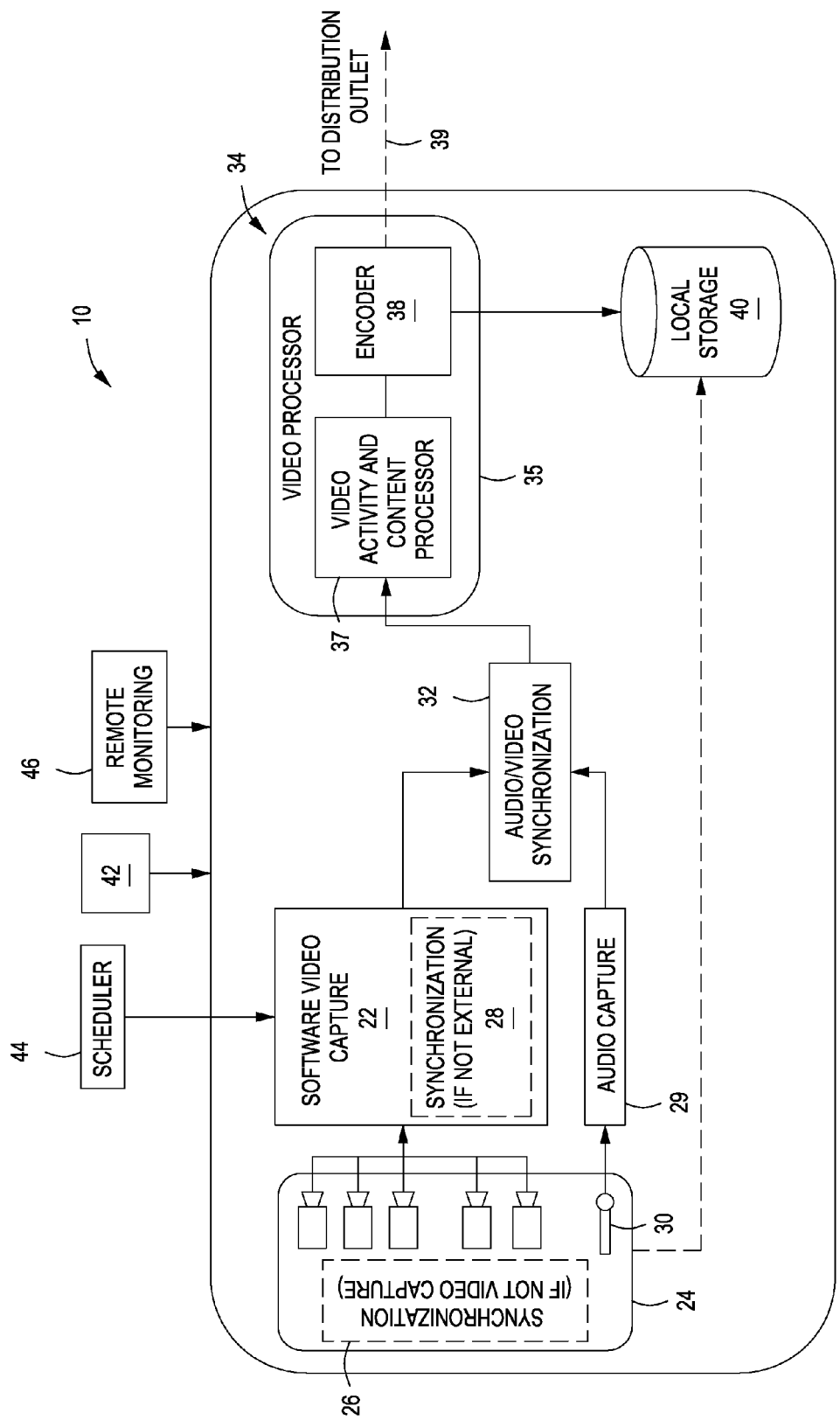
FIG. 2 is a detailed block diagram of the system depicted in FIG. 1.

Referring now to FIG. 2, a more detailed block diagram of the system 10 is depicted. The audio and video assembly 12 includes a video capture module 22 which captures video from a plurality of cameras 24, each of the plurality of cameras 24 having a suitable lens that captures a field of view. The plurality of cameras 24 is arranged about the venue 14 such that the fields of view of the cameras 24 overlap and the union of their fields of view covers the entire venue 14 (i.e., a wide-angle view). Wide coverage is achieved by the rotation and translation of the cameras 24 with respect to each other. The orientation and zoom level of each of the cameras 24 can be manually or automatically adjusted. The cameras 24 may include optical filters. Each of the cameras 24 can further include optical components that can be positioned to eliminate parallax between camera views. The cameras 24 can also include mechanical components that reduce glare from light incident on microphones arranged on a baffle. The plurality of cameras 24 may be collocated with synchronization hardware 26 for synchronizing video taken by the plurality of cameras 24 at the locations of the cameras 24. The video capture module 22 requests and receives video frames from the plurality of cameras 24 via a standard camera interface (e.g., IEEE 1394, GigE Vision, CameraLink). The video capture module 22 is configured to cover an area within which an event takes place, such as a basketball court, a football/baseball stadium, a swimming pool, a lecture hall, an amphitheater for the presentation of drama, a wrestling or boxing arena, etc. The video capture module 22 may also contain a video synchronization module 28 for synchronizing video taken by the plurality of cameras 24 at the location of the video capture module 22. The video synchronization module 28 can include filters, e.g., polarizing filters, that can be used to eliminate artifacts that are visible in captured video images due to illumination conditions in the venue 14 (e.g., saturation due to glare on reflective surfaces in the field of view of the plurality of cameras 24).

The audio and video assembly 12 can also include an audio capture module 29 which can independently and substantially simultaneously record audio from one or more microphones 30 distributed about the venue 14. The video capture module 22 may be coupled with the audio capture module 29 so that the video capture module 22 requests and receives frames at specific time intervals. Alternatively, the audio capture module 29 may be an external device so that the video capture module 22 requests and receives already synchronized video frames. The system 10 may also include a stand-alone audio/video synchronization module 32. The audio/video synchronization module 32 can include filters such as mirrors and prisms that may be used when there is sufficient translation between the optical centers of the cameras 24 to generate parallax that will be visible in a panoramic view. The audio/video synchronization module 32 can associate the incoming audio samples with the video samples based on timestamps.

Figure 3:
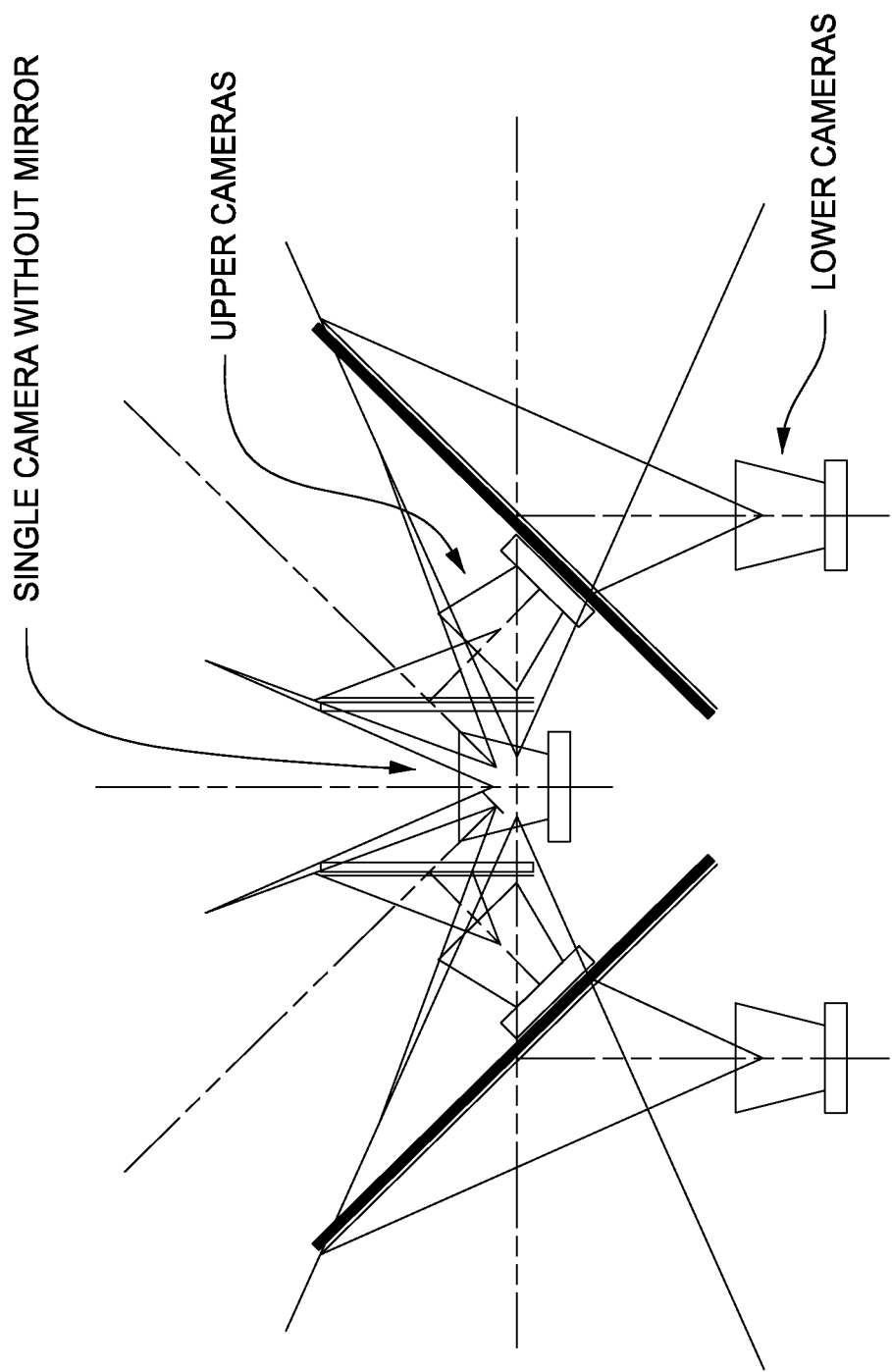
FIG. 3 is a block diagram of one possible arrangement of the optical components of the audio/video synchronization module which reduces parallax.

Some arrangements of camera in the prior art include post-image processing which stitches the images from cameras together where they meet to provide a continuous image to the user. A difficulty arises in that multiple cameras are separated from each other by some distance, on the order of the size of the cameras, resulting in parallax between their views where they abut or overlap. One means of reducing or eliminating this effect uses reflecting mirrors or prisms to relocate the focal points of the multiple cameras to a common point. One possible arrangement of these optical components of the audio/video synchronization module 32 is shown in FIG. 3. In FIG. 3, there are multiple layers of cameras with reflecting mirrors or prisms, in this case two layers with mirrors, plus a single camera without a mirror looking upward along the system axis. The upper layer of cameras and mirrors are oriented upward at an angle, in this case 45°. They can be mounted on the backs of the mirrors or prisms of the lower layer. The space between the assembly of mirrors and prisms can be used to house electronic circuitry associated with the cameras (not shown).

The system 10 can also include a computing platform 34. The computing platform 34 may include an embedded system (e.g., an Intel platform with DUO (1.83 Ghz) processor) comprising one or more processors (not shown) which may implement a video processor 36. The video processor 36 may implement a content analysis module 37 and an encoding module 38 to be described hereinbelow. The processed video/audio data stream can be fed via the one or more processors directly to a distribution outlet 39 via the Internet (not shown) or to a computer-readable medium (local storage) 40. The computer readable medium 40 can also be used for storing the instructions of the system 10 to be executed by the one or more processors, including an operating system, such as the Windows or the Linux operating system. The computer readable medium 40 can include a combination of volatile memory, such as RAM memory, and non-volatile memory, such as flash memory, optical disk(s), and/or hard disk(s). In one embodiment, the non-volatile memory can include a RAID (redundant array of independent disks) system configured at level 0 (striped set) that allows continuous streaming of uncompressed data to disk without frame-drops. In such a system, the processed video/audio data stream can be stored temporarily in the computer readable medium 40 for later output. The computer readable medium 40 together with the one or more processors can implement an Input/Output and storage module which can provide a redundant (local) recording of events. The computer readable medium 40 can also comprise one or more databases or be partially configured as dedicated permanent storage associated with each of the one or more processors. If serious network issues occurred during the broadcast of a live event (as determined by statistics collected by a stream distribution outlet), an administrator may elect to retrieve the redundant copy of the event from the dedicated permanent storage of the computer readable medium 40 to replace the remotely-archived content. Locally archived content is automatically deleted based on configured disk space and/or time constraints.

The system 10 can also include an overlay module 42. The overlay module 42 overlays pre-defined portions of an information panel view onto the selected region of interest (ROI) view.

The system 10 may also include a scheduling module 44 which is coupled to the video capture module 22. The scheduling module 44 grants designated end users administrative and privileged access to the system 10 for the purpose of scheduling events, controlling the broadcast of an event in progress (e.g., to stop a broadcast before its scheduled completion time, or to extend the broadcast). Administrators can perform the following tasks:

Schedule a new event

Modify the properties of an existing event

Cancel an event before it starts

Suspend and resume the broadcast of an event in-progress

Extend the broadcast of an event in-progress (e.g., because a game went into "overtime")

"Clone" an existing event to create a similar event at a new time

Update team rosters

Clear locally recorded (redundant) content

The start and stop times of scheduled events are stored in a local database (i.e., the computer readable medium 40, which is periodically synchronized with a remote database of a stream distribution outlet. This synchronization enables the distribution outlet to manage live broadcast (e.g., to direct clients to an appropriate page to view the broadcast and manage archiving of content).

The system 10 may also include a remote monitoring and management module 46. The remote monitoring and management module 46 permits system administrators to perform the following tasks:

Add or remove a camera from the system

Start, Stop, or Restart components (e.g., a local video archiver component)

Enable or disable a camera

Enable or disable audio input

Configure the maximum disk space to be utilized by local (redundant) archiving

Figure 4:
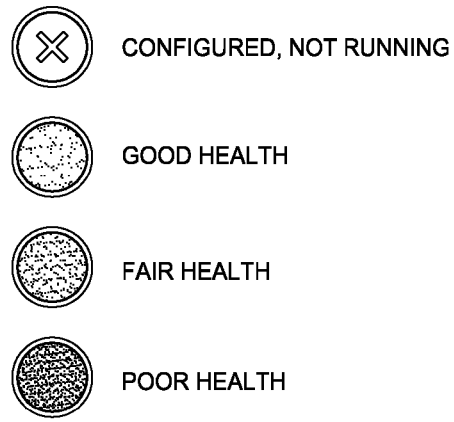
FIG. 4 is a "system health page" web page which presents a color-coded icon representing the health of each component of the system of FIG. 2.
Figure 5:
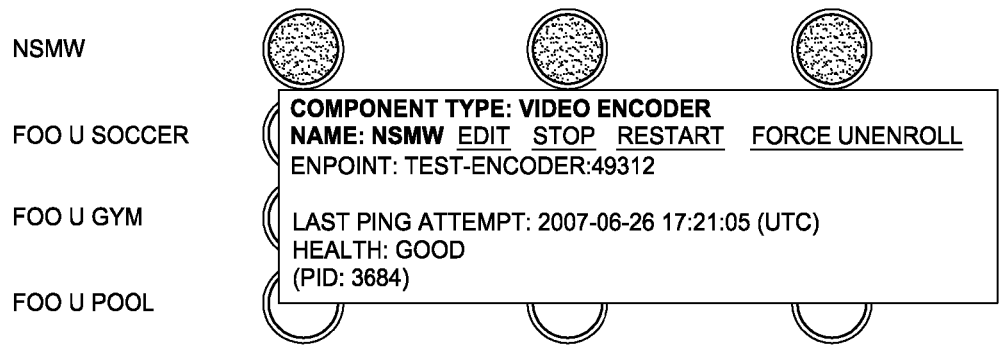
FIG. 5 is a pop-up menu of a full health report that is displayed after hovers a mouse over a component icon in FIG. 4.

Manually specify a "push" publishing point and initiate a test to verify connectivity The remote monitoring and management module 46 also provides a "system health page" web page as shown in FIG. 4, which presents a color-coded icon representing the health of each component:

When a user hovers her mouse over a component icon, a full health report is displayed in a pop-up menu as depicted in FIG. 5. The menu can include links to other actions which the user is permitted to take. If the component's health is not "Good," the health report can include a description of the error condition(s) that caused the health to be degraded. Scenarios where a venue devices health status will be degraded to "Fair" health status include:

A configured camera is administratively disabled

Audio is administratively disabled

The automated region-of-interest (ROI) Selection module is temporarily disabled (the "active" camera is manually selected)

Scenarios where a venue devices health status will be degraded to "Poor" health status include:

One or more of the configured cameras are administratively enabled, but not producing video samples Audio is administratively enabled, but audio samples are not being received Video and/or audio samples cannot be synchronized The automated ROI Selection module is unable to process video A camera's calibration data is missing or no longer correct Video and audio cannot be encoded A live event is in progress, but video cannot be delivered to the configured "push sink" for distribution to clients A system administrator may connect directly to a web server running on an event device to view the system health page. Components running on event devices (microphones and cameras) will be started and stopped by a Pajama Monitor Agent (PMA). The PMA is a Windows Service that:

Exposes web service methods that enable components to be remotely stopped, started, or restarted via a web browser Is responsible for starting and stopping components at their configured times The PMA (not shown) may include high-end multi-core PCs, workstations or dedicated hardware boards.

Referring again to FIG. 2, video processor 36 is configured to implement a content analysis module 37 and an encoding module 38. The content analysis module 37 analyzes the content (including, but not limited to motion, objects and actions) from N camera views provided by the video capture module 22 of the audio and video assembly 12 to determine a region of interest (ROI), which contains the most information and/or activity in the venue 14 at any time instant. The encoding module 38 compresses video and audio samples selected by the content analysis module 37 for efficient transport of the video/audio stream. Video may be encoded at multiple bit rates (e.g., 640×480 with a frame rate of 30 fps at 2000 Kbps bit rate and 320×240 with a frame rate of 10 fps at a 200K bit rate). Encoding at multiple bit rates enables some streaming media servers (e.g., Windows Media Server) to automatically select a video stream that is appropriate to connected clients to ensure the best possible playback experience.

Figure 6:
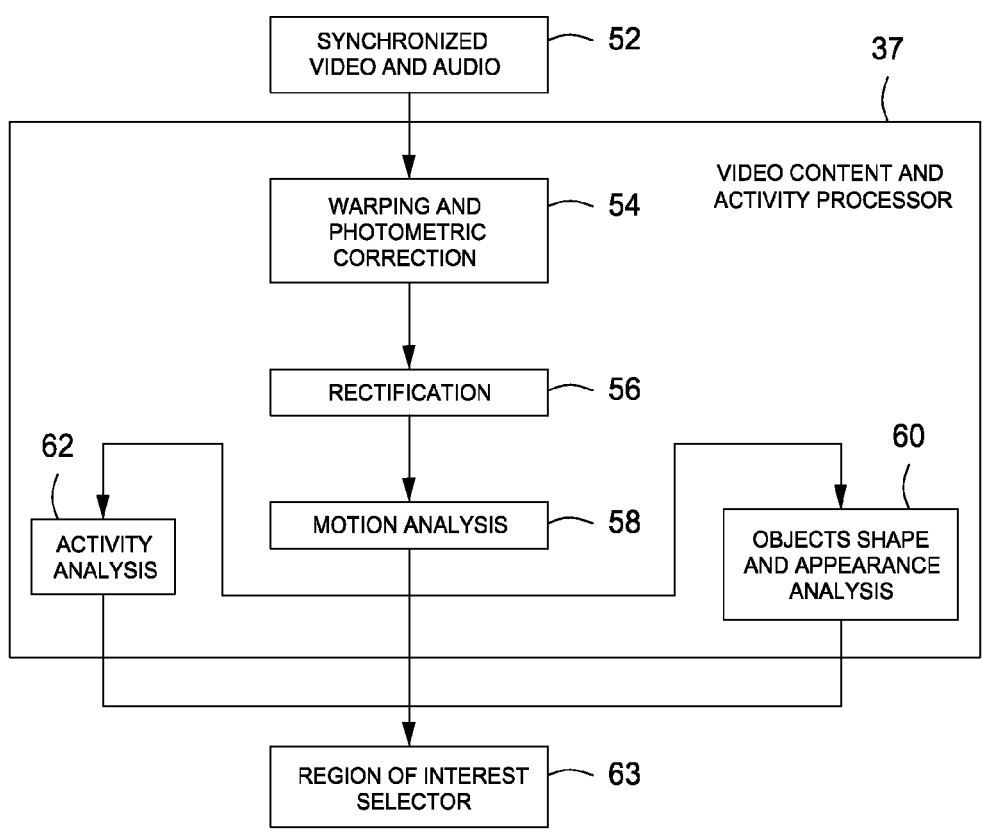
FIG. 6 is a software block diagram of the features implemented as modules as part of the content analysis module of the system of FIG. 2.

Referring now to FIG. 6, there is shown a software block diagram of the features implemented as modules as part of the content analysis module 37. The content analysis module 37 received synchronized video and audio 52 from the audio/video synchronization module 32 and includes a panoramic view generation module 54 with photometric correction, a rectification module 56, a motion analysis module 58, an object detection and shape and appearance analysis module 60, an activity analysis module 62, and a region of interest selector 63.

The panoramic view generation module 54 with photometric correction is designed to remove any distortion in the video that originate from the various types of cameras and lenses that are used. The panoramic view generation module 54 with photometric correction provides color correction, white balance, etc., so as to compensate automatically for a stadium being too bright or too dark. The panoramic view generation module 54 with photometric correction warps the N camera views (provided by the plurality of cameras 24 of the audio and video assembly 12 of FIG. 1) into a common coordinate system. The warps are determined based on a one-time calibration performed at assembly time. The calibration process involves identifying predefined landmarks with known positions in 3D space and recovering projective warps from image point/landmark correspondences. The calibration process is discussed in further detail hereinbelow with respect to FIG. 13.

The rectification module 56 takes all of the synchronized images from all of the plurality of cameras 24 of FIG. 2 and combines them into a mosaic. For example, camera No. 1 may cover the left top of the court, camera No. 2 may cover the middle of the court and camera No. 3 may cover the right half of the court. The images from each of the cameras are put together such that the entire court can be seen in one smooth combined seamless panorama. The rectification module 56 can also correct for any perspective and lens distortion visible in the panoramic (mosaic) view and an information panel view. Perspective distortion is corrected by the one time calibration process to be discussed in connection with FIG. 13 whereby points in distorted views are manually mapped to points at ideal, undistorted locations and a recovery of projective warps from correspondences. Lens distortion is corrected by mapping points in the distorted view to points at ideal undistorted views and recovering the parameters of a $2^{nd}$ order lens distortion model. The views are then transformed by the computed corrective warps.

If, for example N=3 comprising left, center, and right images, then the left and right images are warped onto the center image using a pre-computed homography using bicubic interpolation. Pixel values in the regions of overlap between the views are obtained using the best of several combination rules. Combination rules include averaging and selection of pixel values from a given view. Overlapping regions are blended using a linear function. The wide-angle view is created at a desired pyramid level based on a parameter read from a configuration file. The final result is a grey wide-angle view (seamless panorama) to be used for further processing.

The motion analysis module 58, an object detection and shape and appearance analysis module 60, and an activity analysis module 62 together orchestrate a digital pan. These modules comprise algorithms that detect and analyze the shape of objects and appearance, and analyze motion and activity in the scene, and the change thereof, to determine the most informative region of interest (ROI) at any time. The modules 58, 60, and 62 can operate substantially simultaneously on a scene. The modules 58, 60, and 62 may share data with each other. One, some, or all of the modules 58, 60, and 62 may be employed for a venue specific algorithm. The venue specific algorithm may customize portions of the modules 58, 60, and 62 in addition to or instead of steps to be described hereinbelow.

The motion analysis module 58 can employ a background modeling approach as described in U.S. Pat. No. 6,681,058 ("Hanna and Kumar"), which is incorporated by reference in its entirety. The Hanna and Kumar patent describes a method and apparatus which robustly estimates the brightness or other feature values of background images in a sequence of video images even when the background is obscured by objects over large portions of the video sequence. A histogram is generated for each image region over a plurality of image frames in the sequence. The mode, or most frequently occurring value, of each region as indicated by the histogram is selected as representing the unchanging portion of the image. The mode values of all of the pixels in the regions are then assembled to form the background image.

Once the background is obtained, optical flow and blob tracking can be used to obtain objects of interest (blobs) that are moving that are not part of the background as described in U.S. Pat. No. 6,303,920 ("Wixson"), which is incorporated herein by reference in its entirety. The Wixson patent discloses a method and apparatus for detecting salient motion in an image sequence using optical flow. Namely, for each pixel in an image, frame-to-frame optical flow information is collected over time for computing a rough estimate of the total image distance traveled by each pixel. The resulting optical flow field is applied to warp one or more intermediate measure images that contain intermediate cumulative measurements, thereby aligning these measure images with the current image. The flow fields for an image sequence are used to compute a sum of frame-to-frame optical flow fields for the image sequence to yield a cumulative flow field that can be used to generate a measure of salience for each image point. The measure of salience provides insight as to whether an image point is part of a salient object or part of a non-salient object. The resulting salience measure distinguishes salient objects from non-salient objects. "Salient" objects are objects (blobs) such as a person or vehicle traveling with a sense of direction through a scene. The salient objects are the objects that are analyzed by the shape and appearance analysis module 60 and the activity analysis module 62.

In the shape and appearance analysis module 60, objects are selected from the field of view that are considered to be of interest. The selection is based on 2-dimensional and/or 3-dimensional descriptors that are scale and rotational invariant. Such descriptors include silhouettes and contours of objects such as people. For example, in a lecture or wrestling match, it is important to keep the cameras centered on the lecturer or the wrestlers, and this can be accomplished in part by extracting their silhouettes.

Figure 7:
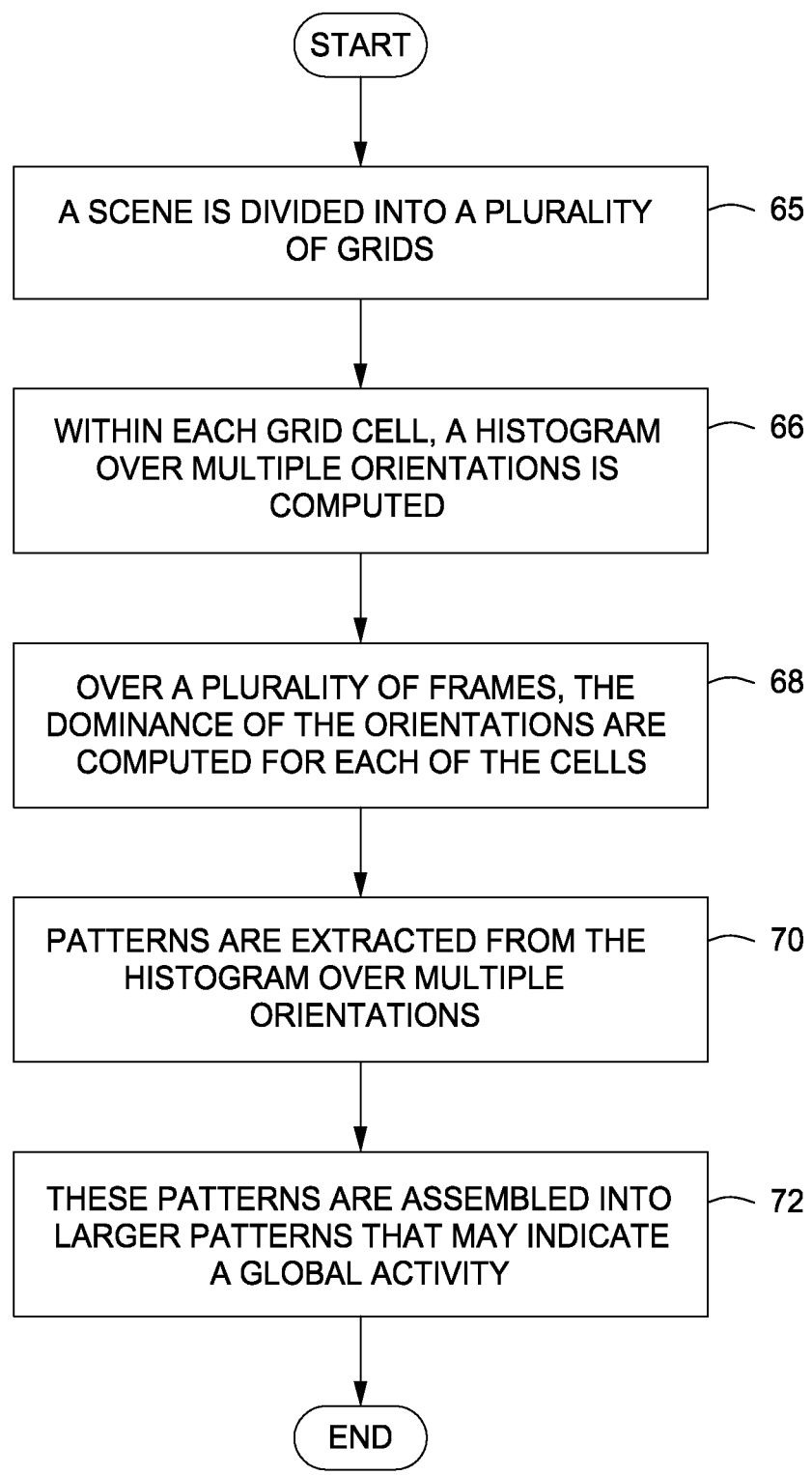
FIG. 7 is a flow chart of how the activity analysis module extracts temporal and spatial patterns using identified salient objects of interest.

In the activity analysis module 62, temporal and spatial patterns are extracted from the field of view. Referring now to the flow chart of FIG. 7, at step 65, a scene is divided into a plurality of grids. At step 66, within each grid cell, a histogram over multiple orientations is computed. For example, the orientations may be up/down, left/right, and angles of rotation. The histogram identifies the dominant direction of each of the cells of the plurality of grids. Then, at step 68, over a plurality of frames, e.g., 100 frames, the dominance of the orientations are computed for each of the cells. By this process, not only is the orientation of each of the cells computed, but the occurrence of salient objects in the cells is measured. The cell size is pre-selected depending on how big the scene is in the field of view. Once the orientations of the plurality of cells are identified, then at step 70, patterns are extracted from the histogram over multiple orientations. At step 72, these patterns are assembled into larger patterns that may indicate a global activity, such as a running play or a pass play. The monitoring of activity as encompassed by the activity analysis module 62 may be configured to start and stop based on a remote scheduling system (not shown). The remote scheduling system may be Internet based.

The objects of interest and the type of activities are next fed to a region-of-interest selector 63. The region of interest selector 63 takes at least one of the extracted salient objects, silhouettes and contours of objects, and temporal and/or spatial patterns identified by one or more of the motion analysis module 58, shape and appearance analysis module 60, the activity analysis module 62, and uses the data to automatically decide where in the scene the plurality of cameras 24 of FIG. 2 should be focused, i.e., to generate a view from the plurality of cameras that contains the action or set of actions or events or set of events providing the most pertinent information about the activity in a scene. The selection process maintains smooth transitions between selected ROI's over time. Based on the view point specified the region-of-interest selector 63 will generate only that part of the wide-angle view which will be broadcasted. The region-of-interest selector 63 generates a color, bicubic interpolated view.

The selection process may include content specific rules. For example, if the game is basketball, the region of interest is selected to be the location in the scene with the most motion. The content specific rules can include focusing the plurality of cameras on a portion of the event based on selecting a player who is at a foul line and attempting a foul shot. If the game is football, and the play is a passing play, the decision is based on the location where objects are converging. If it is a running play, the location where the largest number of objects is chosen since players will be close together. The content specific rules can include focusing the plurality of cameras on a portion of the event based on automatically identifying whether the play is a "pass," a "run," a "punt," a "field goal attempt," or has resulted in a "touchdown." For volleyball games, the content analysis module may detect the presence of a player behind the service line and select an ROI so that that player may be at the center of the ROI.

An optional metadata module (not shown) may be employed in the present invention. The metadata module, as the name implies, provides additional metadata to be displayed in addition to the activities of the present event. For sports venues, the metadata module may comprise scoreboard matting in which a camera may point to the scoreboard during the game, the output of which may be displayed at the bottom of a viewer's screen. In the case of a lecture, in addition to the cameras focusing on a lecturer, accompanying text related to the lecture may be displayed. To incorporate a scoreboard into a field of view, the scoreboard frame is warped to a predefined size. The warped result is blended with the output of the region of interest selector 63 at a specified position with a specified blending coefficient.

The metadata module or an optional intelligence module (not shown) can provide additional feedback to the region of interest selector 63 for selecting the region of interest. The intelligence module can provide a number of miscellaneous features for feedback including analyzing the scoreboard, analyzing the umpire gestures, tracking external markers, such as the marking of a scrimmage line in a football venue, or selecting a view based on commentary made by commentators.

Figure 8:
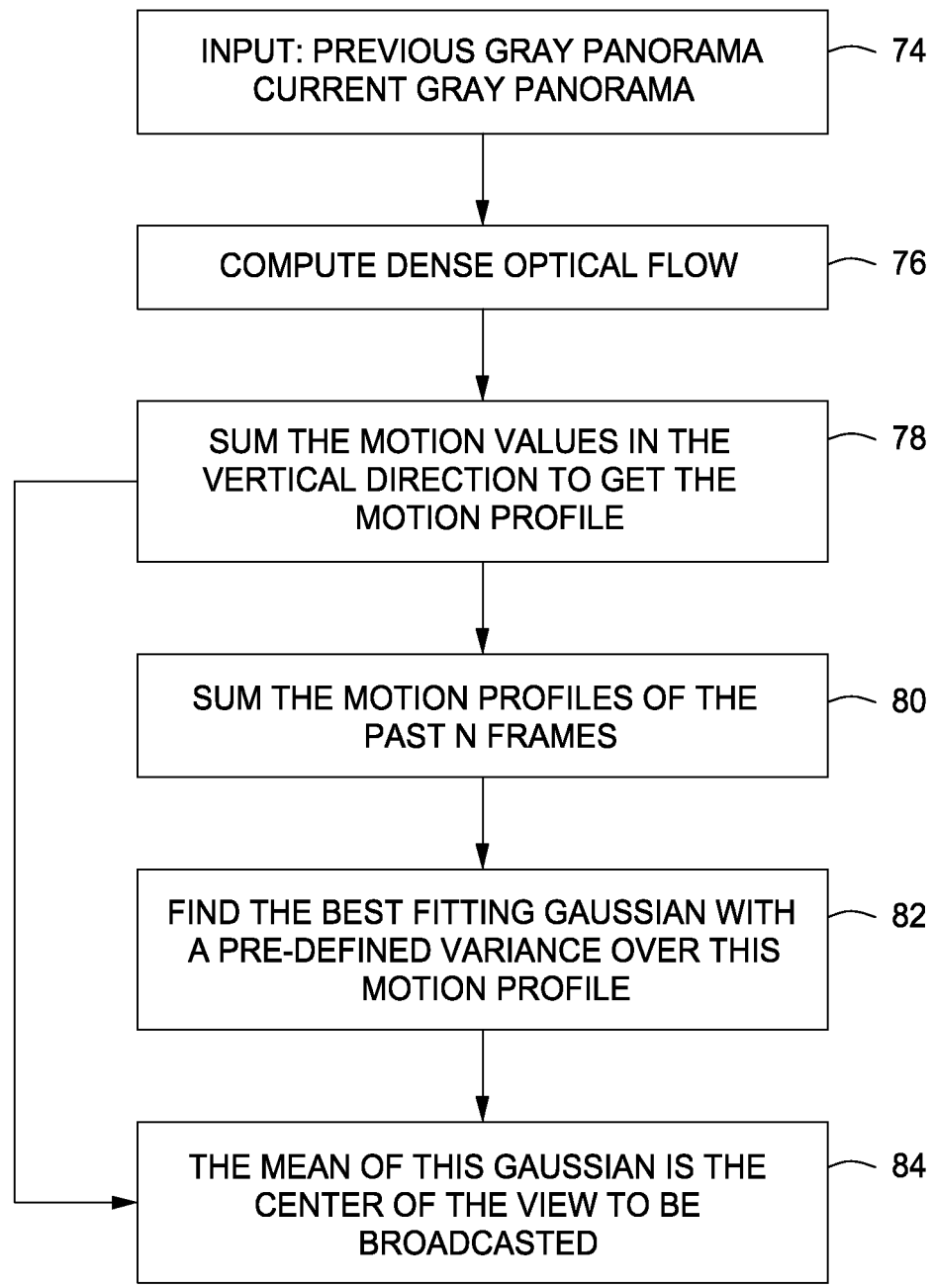
FIG. 8 is a flow diagram depicting an embodiment of the method of the present invention that can be employed for a basketball game venue.

FIG. 8 is a flow diagram depicting an embodiment of the method of the present invention that can be employed for a basketball game venue. At step 74, a current grey wide-angle view and the previous grey wide-angle view are received from the panoramic view generation module 54 of FIG. 6. At step 76, dense optical flow is computed. At step 78, motion values in the vertical direction are summed to obtain the current motion profile. At step 80, the motion profile of step 78 and the motion profiles of the previous N-1 frames are summed. A best Gaussian curve with a predefined variance is fit to the N motion profiles. At step 84, the mean of the Gaussian curve obtained is selected by the region of interest selector 63 as the center of the view to be broadcasted.

Steps 78-82 are performed in the motion analysis module 58 of FIG. 6, while step 84 is performed by the region of interest selector 63 of FIG. 6.

Figure 9A:
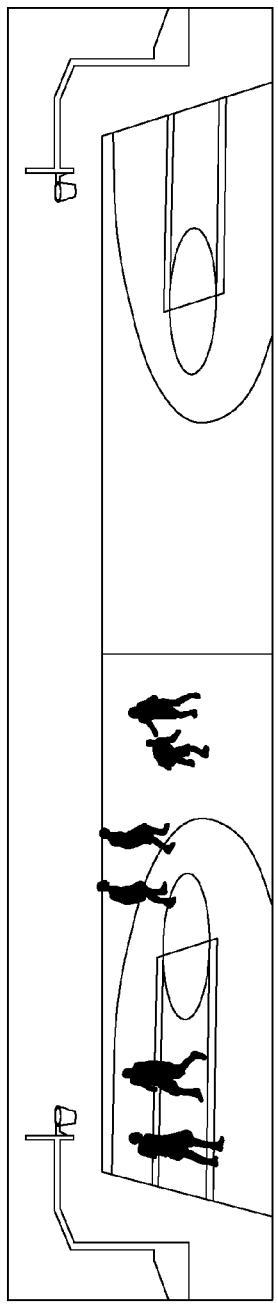
FIG. 9A shows an example basketball game wide-angle view.
Figure 9B:
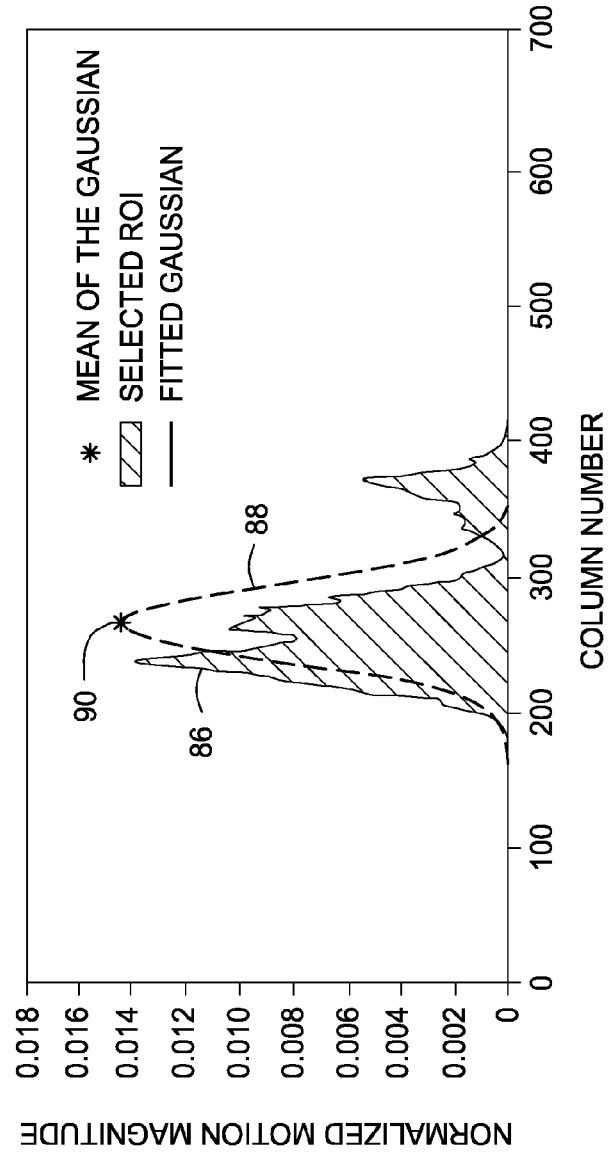
FIG. 9B show an example Gaussian fit for the basketball game wide-angle view depicted in FIG. 9A.

FIG. 9A shows an example basketball game wide-angle view while FIG. 9B show an example Gaussian fit for the basketball game wide-angle view depicted in FIG. 9A. The view of FIG. 9A is shown at pyramid level 2, or ¼th of the original size. Shaded region 86 in FIG. 9B is the vertical profile obtained by summing the motion for each column. The curve 88 is the estimated Gaussian and the dot labeled 90 is the mean of the Gaussian.

Figure 10:
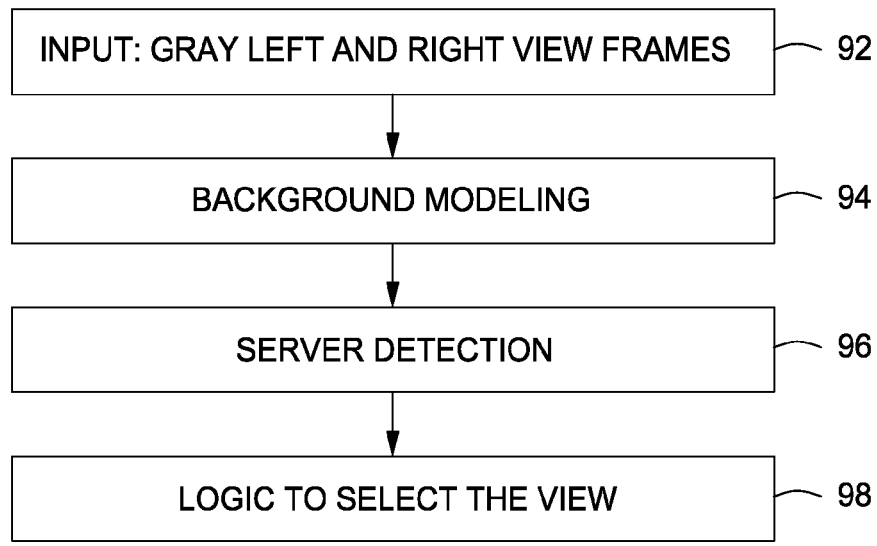
FIG. 10 is a flow diagram depicting an embodiment of the method of the present invention that can be employed for a volleyball game venue.

FIG. 10 is a flow diagram depicting an embodiment of the method of the present invention that can be employed for a volleyball game venue. At step 92, grey left and right view frames are received from the panoramic view generation module 54 of FIG. 6. For the background modeling step 94, a volleyball court without players is determined. A histogram with 255 bins is created for each pixel. Then, the bin containing the pixel value is incremented by a unit. For each pixel, the bin of the respective histogram with the maximum value is selected. The method proceeds to a server detection step, which is concerned with identifying the volleyball server. In step 96, the current set of gray frames from a generated wide-angle view is subtracted from the background. The server regions of interest are then examined for any foreground pixels. If a server is detected among the foreground pixels, the server portion of wide-angle view is broadcasted at step 98. If no server is detected, then the center view of the generated wide-angle view is broadcasted at step 98.

The background modeling step 94 and server detection step 96 are performed in the activity analysis module 62 of FIG. 6, while step 98 is performed by the region of interest selector 63 of FIG. 6.

Figure 11:
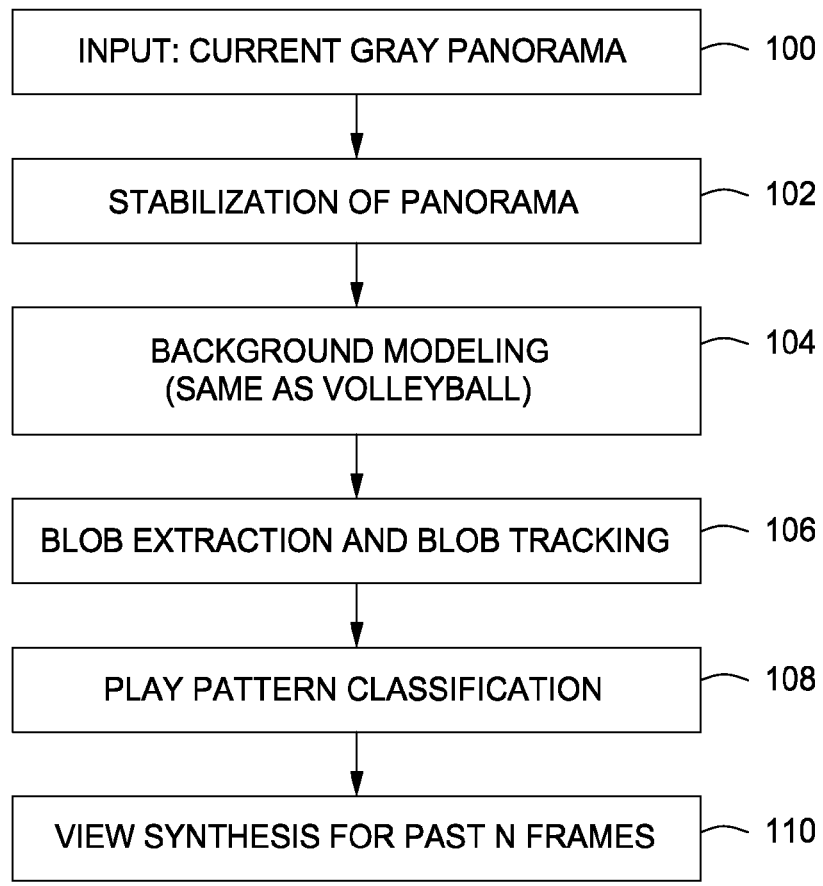
FIG. 11 is a flow diagram depicting an embodiment of the method of the present invention that can be employed for a football game venue.

FIG. 11 is a flow diagram depicting an embodiment of the method of the present invention that can be employed for a football game venue. At step 100, a current grey wide-angle view is received from the panoramic view generation module 54 of FIG. 6. At step 102, the wide-angle view is stabilized by accounting for the shaking of the plurality of cameras due to their outdoor placement in the presence of wind. At step 104, the same background modeling step 94 of FIG. 10 for a volleyball game venue is performed. The method proceeds to step 106, in which blobs are extracted and tracked using an algorithm similar to that described in the Wixson patent of motion analysis module 58. More particularly, the background of the wide-angle view is removed. The remaining difference image is subjected to a thresholding step above which remaining pixels are considered potential blobs. Morphological operations are performed to remove noise. Connected component analysis is performed on the thresholded image to obtain blobs. These salient objects or blobs are then tracked and referred to henceforth as tracklets. The method proceeds to step 108, in which a play is classified as a short play or long play based on the distribution of blobs. To classify the play, it is necessary to examine a substantial predetermined number of wide-angle view frames, e.g., the last 100 frames. From the predetermined number of frame, it is determined whether the blobs are moving or are relatively stationary.

Figure 12:
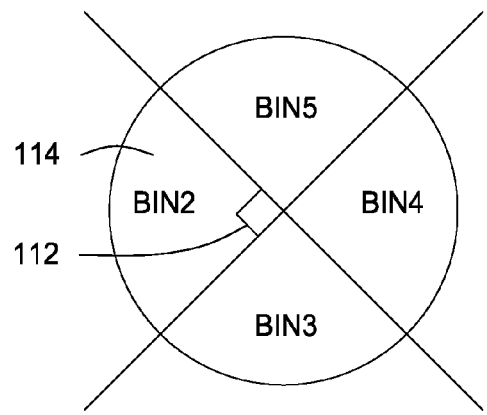
FIG. 12 is a diagram depicting a global histogram having five bins that is created for grouping detected blobs for the purpose of classifying a football play as a long or short play.

Referring now to FIG. 12, a global histogram having five bins is created: one bin 112 for no motion and the remaining four 114 for motion in one of four directions. If most of the blobs remain within a window or are distributed among several bins but are not generally moving, then the play is classified as a short play. In such circumstances, the view selected by the region of interest selector 63 is the same as that would be selected in the basketball algorithm of FIG. 9 with the modification of following the blobs instead of motion. If one of the bins is dominating, then the play is classified as a potential long play. For each tracklet, the orientation of motion is found and the respective bin is incremented. The image is divided into grids and cell level oriented histograms are considered to find the view point for past N (e.g., 100) frames in step 110 of FIG. 11. A dominant motion among the grid cells indicates a long play in that direction, wherein the dominant direction of motion is then selected by the region of interest selector 63 of FIG. 6, otherwise, the play is considered a short play.

Play classification in step 108 is performed in the activity analysis module 62, while the background modeling step 105 and blob extraction and tracking step 106 are performed in the motion analysis module 58 of FIG. 6.

Calibration of the system of the present invention includes geometric calibration and photometric calibration. Geometric calibration involves recovering the relative orientation of the venue (e.g., a sports field) with respect to a plurality of cameras distributed about the venue. In addition to a geometric calibration of venue, there is also a geometric calibration performed for one or more cameras focused on a metadata display (e.g., a scoreboard).

Figure 13:
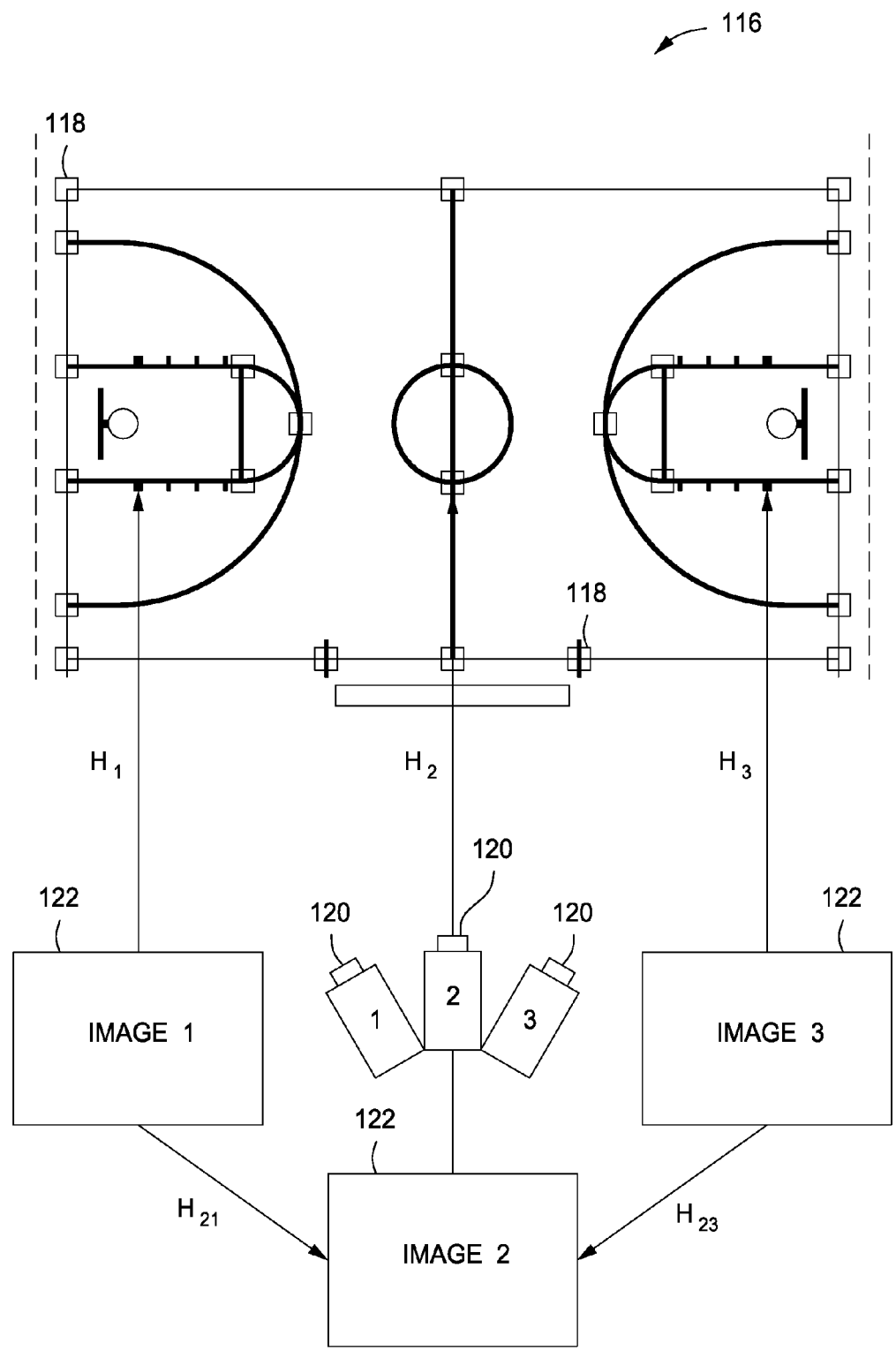
FIG. 13 is a block diagram of a venue with a plurality of highlighted landmarks and a plurality of cameras to be calibrated using the landmarks in a geometric calibration algorithm.

Performing a geometric calibration is contingent upon fulfilling two prerequisites: (1) the geometric structure of the venue is known; and (2) there exists a user interface for a user to manually mark known landmarks in the venue. Referring now to FIG. 13, there is shown a venue 116 (in this case a basketball court) with a plurality of highlighted landmarks 118 and a plurality of cameras 120 to be calibrated using the highlighted landmarks 118 relative to the venue 116. The user is shown images 122 of the venue 116 with the plurality of the landmarks 118 highlighted as shown. The user marks points of each of the landmarks in each of the camera views. Each of the marked points 118 in the camera views is refined for sub-pixel accuracy.

For a given camera view, the sub-pixel coordinate of an imaged landmark 118 and the corresponding geometric position (correspondence) of the landmark 118 in the venue 116 are now known. Given N such correspondences, where N is greater than 4, a least mean square fit homography H1, H2, H3, etc., is computed between a camera view (i.e., the images 122 of each of the cameras 120) and the venue 116 for each of the camera views. As a result, there are $H_i$ homographies, where I=1 to the number of camera views. In addition to the individual camera view homographies $H_i$, the homographies between camera views $H_{ij}$, i.e., from view j to view i, are calculated according to the equation $$H_{ij}=\text{inv}(H_i)*H_1.$$

Together the homographies $H_i$ and $H_{ij}$ define the relative orientations between the venue 116 and the cameras 120. These homographies are incorporated into the calculations performed in the panoramic view generation module 54 and the rectification module 56 of FIG. 6.

For the metadata display calibration, in the case of a scoreboard, a user marks four endpoints (assuming a rectangular scoreboard) in the view of the scoreboard camera. Using the four endpoints, a correcting homography is computed.

Figure 14:
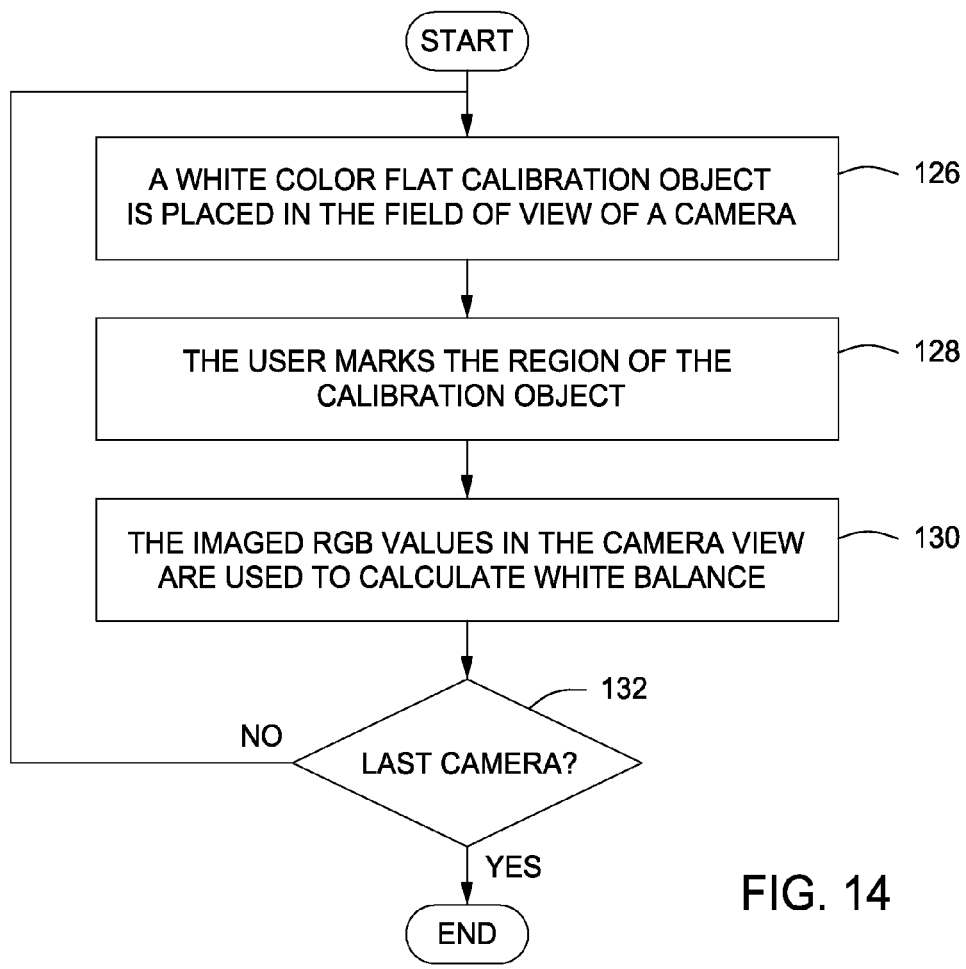
FIG. 14 is a flow diagram depicting the steps of photometric calibration of cameras in a venue.

Referring now to FIG. 14, a flow diagram depicting the steps of photometric calibration is presented. For photometric calibration (as employed in the panoramic view generation module 54 of FIG. 6), at step 126, a white color flat calibration object is placed in the field of view of a camera. At step 128, the user marks the region of the calibration object. At step 130, the imaged RGB values in the camera view are used to calculate white balance. At step 132, if this is not the last camera to be calibrated, then steps 126-130 are repeated for the next camera.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer-implemented method for focusing cameras on an area of activity in an event comprising:
    selecting salient objects from a field of view in a video stream, generated by a plurality of cameras, where saliency is determined by shape, appearance and motion of the objects;
    analyzing activity in the field of view to extract patterns from the field of view, where the patterns are at least one of temporal and spatial;
    determining a region of interest based on the extracted patterns and the selected salient objects in view of content specific rules corresponding to a type of the event, and based on a region in the field of view that is determined from the extracted patterns to have a relatively high degree of motion; and
    focusing one or more of the plurality of cameras on the determined region of interest based on the content specific rules,
    wherein the content specific rules comprise at least one rule for focusing the plurality of cameras on a portion of the region of interest based on the relationship of salient objects in the region of interest.

2. The method of claim 1 wherein the motion is particularly in one direction.

3. The method of claim 1 further comprising synchronizing the video stream with a received audio stream.

4. The method of claim 1, further comprising extracting a background in the video stream from a wide-angle view.

5. The method of claim 1 wherein when the activity is a type of sporting event, and the content specific rules comprise one or more rules for focusing the plurality of cameras on a scenario of interest in said type of sporting event.

6. The method of claim 1 wherein selecting the salient objects further comprises:
    selecting objects in the field of view based on descriptors that are scale and rotational invariant.

7. The method of claim 6, further comprising selecting one of silhouettes, contours, and silhouettes and contours of the objects as the descriptors.

8. A computer-implemented method for focusing cameras on an area of activity in an event comprising:
    selecting salient objects from a field of view in a video stream, generated by a plurality of cameras, where saliency is determined by shape, appearance and motion of the objects;
    analyzing activity in the field of view to extract patterns from the field of view, where the patterns are at least one of temporal and spatial;
    assembling the extracted patterns into larger patterns indicating a global activity;
    determining a region of interest based on the extracted patterns and the selected salient objects in view of content specific rules corresponding to a type of the event; and
    focusing one or more of the plurality of cameras on the determined region of interest based on the content specific rules,
    wherein the content specific rules comprise at least one rule for focusing the plurality of cameras on a portion of the region of interest based on the relationship of salient objects in the region of interest.

9. The method of claim 8 further comprising:
    determining the region of interest as the region in the field of view where the assembled larger patterns converge.

10. A computer-implemented method for focusing cameras on an area of activity in an event comprising:
    selecting salient objects from a field of view in a video stream, generated by a plurality of cameras, where saliency is determined by shape, appearance and motion of the objects;
    analyzing activity in the field of view to extract patterns from the field of view, where the patterns are at least one of temporal and spatial;
    determining a region of interest based on the extracted patterns and the selected salient objects in view of content specific rules corresponding to a type of the event, wherein the region of interest is determined as a region in the field of view with a relatively large number of salient objects; and
    focusing one or more of the plurality of cameras on the determined region of interest based on the content specific rules,
    wherein the content specific rules comprise at least one rule for focusing the plurality of cameras on a portion of the region of interest based on the relationship of salient objects in the region of interest.

11. A computer implemented method for determining video sensor focus comprising:
    receiving a live video stream of an event from a video sensor;
    analyzing the live video stream to determine a changing region of most interest as compared to other regions in view of content specific rules corresponding to a type of the event, as the live video of the event is streamed, wherein the region of most interest is determined as the region with the greatest amount of salient activity; and
    modifying focus of the video sensor on the determined changing region of most interest as the live video is streamed, based on the content specific rules,
    wherein the content specific rules comprise at least one rule for focusing the plurality of cameras on a portion of the region of interest based on the relationship of salient objects in the region of interest.

12. The method of claim 11, further comprising:
determining the salient activity according to shape, appearance and motion of detected objects in the video stream.

13. The method of claim 12, further comprising:
determining the salient activity by further analyzing activity in the video stream to extract patterns, where the patterns are at least one of temporal and spatial; and
assembling the extracted patterns into larger patterns indicating a global activity and determining the region of interest based on a region with the global activity and the salient objects.

14. The method of claim 11 wherein when the event is a football game, and the content specific rules comprise focusing the plurality of cameras on an automatically identified location of a play in the event, where a play is at least one of a "pass," a "run," a "punt," a "field goal attempt," or has resulted in a "touchdown".

15. The method of claim 11 wherein when the event is a basketball game, and the content specific rules comprise focusing the plurality of cameras on a portion of the event based on selecting a player who is at a foul line and attempting a foul shot.

16. The method of claim 11 wherein when the event is a volleyball game, and the content specific rules comprise focusing the plurality of cameras on a portion of the event based on selecting a player behind a service line.

\* \* \* \* \*